(12) United States Patent
Xu et al.

(10) Patent No.: US 11,296,851 B2
(45) Date of Patent: Apr. 5, 2022

(54) REMOTE INTERFERENCE MANAGEMENT REFERENCE SIGNAL TRANSMISSION

(71) Applicant: QUALCOMM Incorporated, San Diego, CA (US)

(72) Inventors: Huilin Xu, San Diego, CA (US); Yi Huang, San Diego, CA (US); Tingfang Ji, San Diego, CA (US)

(73) Assignee: QUALCOMM INCORPORATED, San Diego, CA (US)

( * ) Notice: Subject to any disclaimer, the term of this patent is extended or adjusted under 35 U.S.C. 154(b) by 25 days.

(21) Appl. No.: 16/579,202

(22) Filed: Sep. 23, 2019

(65) Prior Publication Data

US 2020/0106589 A1 Apr. 2, 2020

Related U.S. Application Data

(60) Provisional application No. 62/738,819, filed on Sep. 28, 2018.

(51) Int. Cl.
 *H04L 5/00* (2006.01)
 *H04J 13/16* (2011.01)
 *H04W 76/11* (2018.01)

(52) U.S. Cl.
 CPC .......... *H04L 5/0073* (2013.01); *H04J 13/16* (2013.01); *H04L 5/0051* (2013.01); *H04W 76/11* (2018.02)

(58) Field of Classification Search
 None
 See application file for complete search history.

(56) References Cited

U.S. PATENT DOCUMENTS

| 9,699,731 | B2 * | 7/2017 | Khoryaev | H04W 72/082 |
| 2014/0219113 | A1 * | 8/2014 | Li | H04B 17/345 |
| | | | | 370/252 |

(Continued)

OTHER PUBLICATIONS

CMCC: "Discussion on framework for RIM", 3GPP Draft; R1-1808841, 3rd Generation Partnership Project (3GPP), Mobile Competence Centre, 650, Route Des Lucioles, F-06921 Sophia-Antipolis Cedex France, vol. RAN WG1, No. Gothenburg, Sweden; 20180820-20180824, Aug. 11, 2018 (Aug. 11, 2018), 8 pages, XP051516214, Retrieved from the Internet: URL:http://www.3gpp.org/ftp/tsg%5Fran/WG1%5FRL1/TSGR1%5F94/Docs/R1%2D1808841%2Ezip.

(Continued)

*Primary Examiner* — Anh Ngoc M Nguyen
(74) *Attorney, Agent, or Firm* — Harrity & Harrity, LLP

(57) ABSTRACT

A method, base station (BS), user equipment (UE), apparatus, and computer program product for wireless communication are provided. An aggressor BS may cause a remote interference condition for a victim BS, and the victim BS may transmit a reference signal to the aggressor BS to enable a remote interference management (RIM) operation to be performed. However, the aggressor BS may be unable to identify the victim BS based at least in part on the reference signal, and may fail to transmit a reference signal as a response. Further, when the aggressor BS does transmit a reference signal, the victim BS may be unable to identify the aggressor BS. This may reduce an effectiveness of RIM operations. In some aspects, BSs may transmit reciprocal reference signals including identification information to enable effective RIM operations.

30 Claims, 9 Drawing Sheets

(56) References Cited

U.S. PATENT DOCUMENTS

2015/0201421 A1* 7/2015 Park .................. H04L 1/00
455/452.1
2016/0270086 A1* 9/2016 Stirling-Gallacher ......................
H04W 72/1226

OTHER PUBLICATIONS

CMCC: "Draft summary on Study on NR-RIM", 3GPP Draft; R1-1809973, 3rd Generation Partnership Project (3GPP), Mobile Competence Centre, 650, Route Des Lucioles, F-06921 Sophia-Antipolis Cedex France, vol. RAN WG1, No. Gothenburg, Sweden; 20180820-20180824, Aug. 25, 2018 (Aug. 25, 2018), 30 pages, XP051517330, Retrieved from the Internet: URL:http://www.3gpp.org/ftp/tsg%5Fran/WG1%5FRL1/TSGR1%5F94/Docs/R1%2D1809973%2Ezip.
International Search Report and Written Opinion—PCT/US2019/052673—ISA/EPO—Dec. 5, 2019.
LG Electronics: "Discussions on mechanism for NR RIM support",3GPP Draft; R1-1808529, 3rd Generation Partnership Project (3GPP), Mobile Competence Centre, 650, Route Des Lucioles, F-06921 Sophia-Antipolis Cedex France, vol. RAN WG1, No. Gothenburg, Sweden; 20180820-2018082411 Aug. 2018 (Aug. 11, 2018), pp. 1-8, XP051515907, Retrieved from the Internet:URL:http://www.3gpp.org/ftp/tsg%5Fran/WG1%5FRL1/TSGR1%5F94/Docs/R1%2D1808529%2Ezip.

* cited by examiner

REMOTE INTERFERENCE MANAGEMENT REFERENCE SIGNAL TRANSMISSION

CROSS-REFERENCE TO RELATED APPLICATION

This application claims priority to U.S. Provisional Patent Application No. 62/738,819, filed on Sep. 28, 2018, entitled "REMOTE INTERFERENCE MANAGEMENT REFERENCE SIGNAL TRANSMISSION," which is hereby expressly incorporated by reference herein.

BACKGROUND

Field

Aspects of the present disclosure generally relate to wireless communication, and more particularly to techniques and apparatuses for remote interference management reference signal transmission.

Background

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, and/or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, LTE/LTE-Advanced is a set of enhancements to the Universal Mobile Telecommunications System (UMTS) mobile standard promulgated by the Third Generation Partnership Project (3GPP).

A wireless communication network may include a number of base stations (BSs) that can support communication for a number of user equipment (UEs). A UE may communicate with a BS via the downlink and uplink. The downlink (or forward link) refers to the communication link from the BS to the UE, and the uplink (or reverse link) refers to the communication link from the UE to the BS. As will be described in more detail herein, a BS may be referred to as a Node B, a gNB, an access point (AP), a radio head, a transmit receive point (TRP), a 5G BS, a 5G Node B, and/or the like.

The above multiple access technologies have been adopted in various telecommunication standards to provide a common protocol that enables different wireless communication devices to communicate on a municipal, national, regional, and even global level. 5G, which may also be referred to as New Radio (NR), is a set of enhancements to the LTE mobile standard promulgated by the Third Generation Partnership Project (3GPP). 5G is designed to better support mobile broadband Internet access by improving spectral efficiency, lowering costs, improving services, making use of new spectrum, and better integrating with other open standards using OFDM with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation. However, as the demand for mobile broadband access continues to increase, there exists a need for further improvements in LTE and 5G technologies. Preferably, these improvements should be applicable to other multiple access technologies and the telecommunication standards that employ these technologies.

In most scenarios, a downlink signal of a base station is only observable within and around the edges of coverage areas of cells provided by the base station. In some scenarios, however, the downlink signal of the base station may propagate far beyond the coverage area (e.g., by tens of kilometers, hundreds of kilometers, etc.) as a result of atmospheric ducting; reflections by mountains, the ocean surface, or clouds; and/or the like. In such a case, the downlink signal of the base station may create interference for another base station, which may be termed a remote interference condition. The base station that transmits the downlink signal may be referred to as an aggressor base station and the base station that receives the downlink signal may be referred to as a victim base station. In some cases, interference may be reciprocal, such that a first base station is an aggressor to a second base station (which is thus a victim), and the second base station is an aggressor to the first base station (which is thus a victim). In some cases, a plurality of base stations may be aggressors and/or victims. For example, communications of a victim base station may be interfered with by transmissions from a plurality of aggressor base stations.

One situation where such interference may occur is when the aggressor base station and the victim base station have the same time division duplexing (TDD) configuration. This may occur because the aggressor base station and the victim base station are far apart, so normal interference countermeasures (e.g., different TDD configurations, gaps, etc.) do not take into account both the victim base station and the aggressor base station. A downlink signal of the aggressor base station, with the propagation delay between the aggressor base station and the victim base station, may overlap into an uplink portion of the victim base station's frame configuration. This may cause interference between the victim base station and uplink communications to the victim base station.

The victim base station, the aggressor base station, and/or another device (e.g., a UE associated with the victim base station, a network device, an operation/administration/management device, etc.) may perform one or more remote interference management (RIM) operations to mitigate remote interference. In some cases, two or more devices may coordinate to perform RIM operations to mitigate remote interference. For example, the victim base station and the aggressor base station may alter respective communication configurations to reduce a likelihood of overlap between downlink transmissions of the aggressor base station and uplink transmissions of the victim base station. Similarly, the aggressor base station may alter a transmit power, a transmit angle, and/or the like to reduce a likelihood that transmissions of the aggressor base station interfere with communications of the victim base station, and the victim base station may alter a gain value, a receive angle, and/or the like to reduce a likelihood of receiving transmissions of the aggressor base station. Base stations may transmit reference signals to enable measurement of channel conditions and/or interference, which may enable the base stations to determine a RIM operation that may be successful in mitigating remote interference.

However, in cases where a plurality of aggressor base stations interfere with a single victim base station, the victim base station may receive a plurality of reference signals, and may only be able to determine an amount of aggregate interference, rather than a contribution of each base station to a remote interference condition. In this case, victim base station may be unable to successfully select a RIM operation to perform, to identify an aggressor base station to cause the aggressor base station to perform a RIM operation, and/or the like. Further, in some cases, only one of the victim base station or the aggressor base station may transmit a reference signal when a remote interference condition is detected. As a result, for example, the victim base station may be able to determine remote interference based at least in part on a received reference signal, but the aggressor base station may not be able to determine remote interference. This may result in less successful RIM operations being selected, the aggressor base station failing to perform any RIM operation, a reciprocal remote interference condition failing to be mitigated, and/or the like.

SUMMARY

Some aspects described herein may enable improved remote interference management (RIM) reference signal transmission. For example, a first base station (e.g., a victim base station) may detect an interference condition, and may transmit a reference signal that includes information identifying the first base station. In this case, a second base station (e.g., an aggressor base station that receives the reference signal) may determine an identity of the first base station, which may assist in the second base station determining a RIM operation (e.g., such as changing a transmit angle to avoid a location at which the first base station is positioned). Similarly, the second base station, as a response to receiving the first reference signal, may transmit a second reference signal that includes information identifying the second base station. In this case, the first base station may determine an identity of the second base station, which may assist the first base station in determining a RIM operation (e.g., such as by enabling the first base station to distinguish between the second base station and one or more other base stations that are contributing to the interference condition). In this way, an efficacy of RIM operations is improved, thereby reducing a likelihood of interference in a network, improving network performance, reducing a likelihood of dropped packets and/or lost communications, and/or the like.

In an aspect of the disclosure, a method, a base station (BS), an apparatus, and a computer program product are provided.

In some aspects, the method may by performed by a first base station. The method may include transmitting, based at least in part on an occurrence of a remote interference condition, a first reference signal, wherein the first reference signal corresponds to a first device identifier identifying the first base station. The method may include receiving, after transmitting the first reference signal, a second reference signal, wherein the second reference signal corresponds to a second device identifier identifying a second base station.

In some aspects, the first base station may include a memory and one or more processors coupled to the memory. The memory and the one or more processors may be configured to transmit, based at least in part on an occurrence of a remote interference condition, a first reference signal, wherein the first reference signal corresponds to a first device identifier identifying the first base station. The memory and the one or more processors may be configured to receive, after transmitting the first reference signal, a second reference signal, wherein the second reference signal corresponds to a second device identifier identifying a second base station.

In some aspects, the apparatus may include means for transmitting, based at least in part on an occurrence of a remote interference condition, a first reference signal, wherein the first reference signal corresponds to a first device identifier identifying the apparatus. The apparatus may include means for receiving, after transmitting the first reference signal, a second reference signal, wherein the second reference signal corresponds to a second device identifier identifying a base station.

In some aspects, the computer program product may include a non-transitory computer-readable medium storing one or more instructions. The one or more instructions, when executed by one or more processors of a first base station, may cause the one or more processors to transmit, based at least in part on an occurrence of a remote interference condition, a first reference signal, wherein the first reference signal corresponds to a first device identifier identifying the first base station. The one or more instructions, when executed by the one or more processors of the first base station, may cause the one or more processors to receive, after transmitting the first reference signal, a second reference signal, wherein the second reference signal corresponds to a second device identifier identifying a second base station.

In some aspects, the method may by performed by a first base station. The method may include receiving a first reference signal associated with a remote interference condition, wherein the first reference signal corresponds to a first device identifier identifying a second base station. The method may include transmitting, after receiving the first reference signal, a second reference signal as a response to receiving the first reference signal, wherein the second reference signal corresponds to a second device identifier identifying the first base station.

In some aspects, the first base station may include a memory and one or more processors coupled to the memory. The memory and the one or more processors may be configured to receive a first reference signal associated with a remote interference condition, wherein the first reference signal corresponds to a first device identifier identifying a second base station. The memory and the one or more processors may be configured to transmit, after receiving the first reference signal, a second reference signal as a response to receiving the first reference signal, wherein the second reference signal corresponds to a second device identifier identifying the first base station.

In some aspects, the apparatus may include means for receiving a first reference signal associated with a remote interference condition, wherein the first reference signal corresponds to a first device identifier identifying a base station. The apparatus may include means for transmitting, after receiving the first reference signal, a second reference signal as a response to receiving the first reference signal, wherein the second reference signal corresponds to a second device identifier identifying the apparatus.

In some aspects, the computer program product may include a non-transitory computer-readable medium storing one or more instructions. The one or more instructions, when executed by one or more processors of a first base station, may cause the one or more processors to receive a first reference signal associated with a remote interference condition, wherein the first reference signal corresponds to a first device identifier identifying a second base station. The one or more instructions, when executed by the one or more processors of the first base station, may cause the one or more processors to transmit, after receiving the first reference signal, a second reference signal as a response to receiving the first reference signal, wherein the second reference signal corresponds to a second device identifier identifying the first base station.

Aspects generally include a method, apparatus, system, computer program product, non-transitory computer-readable medium, user equipment, base station, wireless communication device, and processing system as substantially described herein with reference to and as illustrated by the accompanying drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purpose of illustration and description, and not as a definition of the limits of the claims.

DETAILED DESCRIPTION

Figure 1:
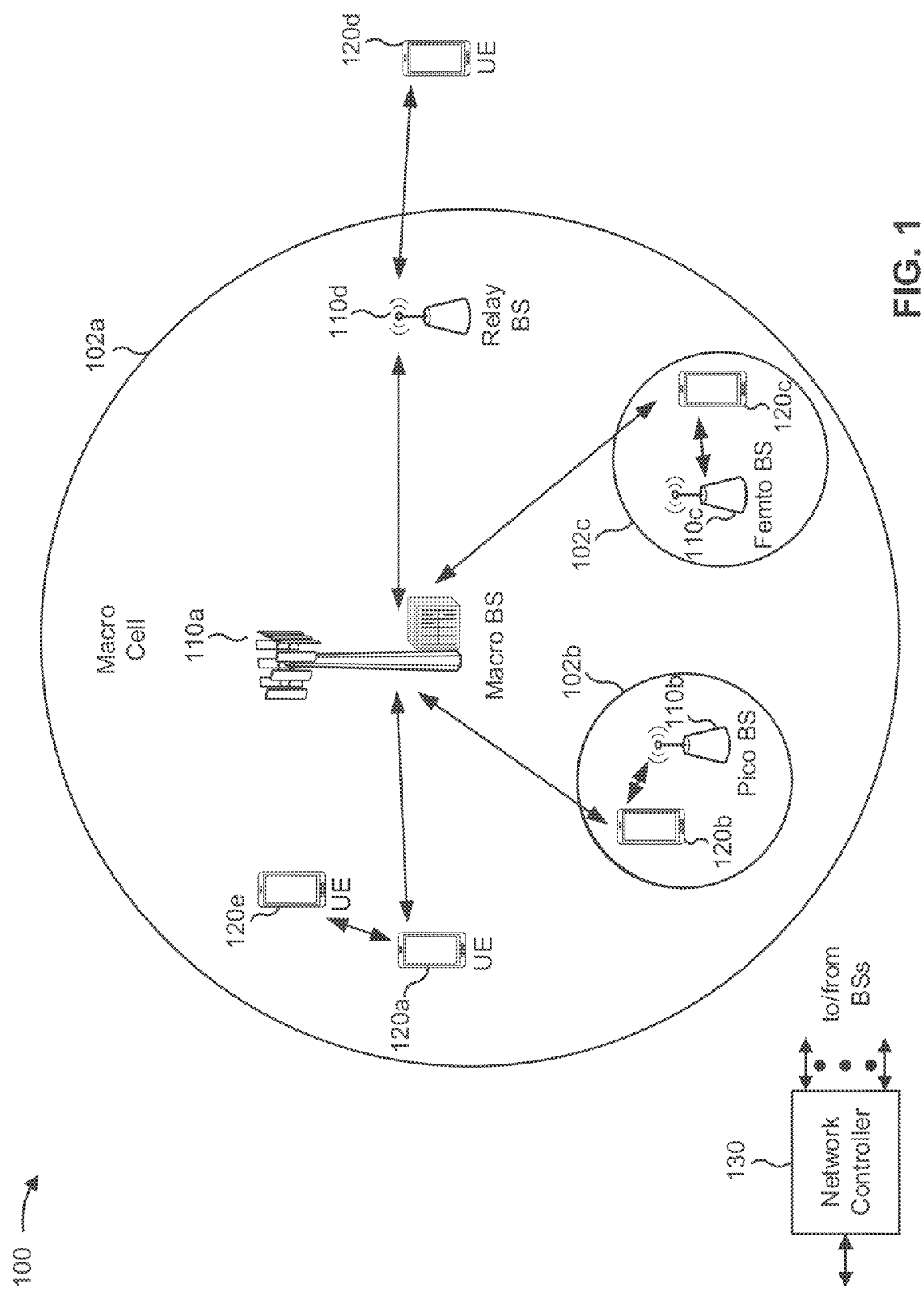
FIG. 1 is diagram illustrating an example of a wireless communication network.

The detailed description set forth below in connection with the appended drawings is intended as a description of various configurations and is not intended to represent the configurations in which the concepts described herein may be practiced. The detailed description includes specific details for the purposes of providing a thorough understanding of various concepts. However, it will be apparent to those skilled in the art that these concepts may be practiced without these specific details. In some instances, well-known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, modules, components, circuits, steps, processes, algorithms, and/or the like (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented with a "processing system" that includes one or more processors. Examples of processors include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, and/or the like, whether referred to as software, firmware, middleware, microcode, hardware description language, or otherwise.

Accordingly, in one or more example embodiments, the functions described may be implemented in hardware, software, firmware, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), compact disk ROM (CD-ROM) or other optical disk storage, magnetic disk storage or other magnetic storage devices, combinations of the aforementioned types of computer-readable media, or any other medium that can be used to store computer executable code in the form of instructions or data structures that can be accessed by a computer.

It is noted that while aspects may be described herein using terminology commonly associated with 3G and/or 4G wireless technologies, aspects of the present disclosure can be applied in other generation-based communication systems, such as 5G and later, including 5G technologies.

FIG. 1 is a diagram illustrating a network 100 in which aspects of the present disclosure may be practiced. The network 100 may be an LTE network or some other wireless network, such as a 5G network. Wireless network 100 may include a number of BSs 110 (shown as BS 110a, BS 110b, BS 110c, and BS 110d) and other network entities. A BS is an entity that communicates with user equipment (UEs) and may also be referred to as a base station, a 5G BS, a Node B, a gNB, a 5G NB, an access point, a transmit receive point (TRP), and/or the like. Each BS may provide communication coverage for a particular geographic area. In 3GPP, the term "cell" can refer to a coverage area of a BS and/or a BS subsystem serving this coverage area, depending on the context in which the term is used.

A BS may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). A BS for a macro cell may be referred to as a macro BS. A BS for a pico cell may be referred to as a pico BS. A BS for a femto cell may be referred to as a femto BS or a home BS. In the example shown in FIG. 1, a BS 110a may be a macro BS for a macro cell 102a, a BS 110b may be a pico BS for a pico cell 102b, and a BS 110c may be a femto BS for a femto cell 102c. A BS may support one or multiple (e.g., three) cells. The terms "eNB", "base station", "5G BS", "gNB", "TRP", "AP", "node B", "5G NB", and "cell" may be used interchangeably herein. In some cases, a first BS may interfere with a second BS that is outside of a cell of the first BS, which may result in a remote interference condition.

In some examples, a cell may not necessarily be stationary, and the geographic area of the cell may move according to the location of a mobile BS. In some examples, the BSs may be interconnected to one another and/or to one or more other BSs or network nodes (not shown) in the access network 100 through various types of backhaul interfaces such as a direct physical connection, a virtual network, and/or the like using any suitable transport network.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay station 110d may communicate with macro BS 110a and a UE 120d in order to facilitate communication between BS 110a and UE 120d. A relay station may also be referred to as a relay BS, a relay base station, a relay, and/or the like.

Wireless network 100 may be a heterogeneous network that includes BSs of different types, e.g., macro BSs, pico BSs, femto BSs, relay BSs, and/or the like. These different types of BSs may have different transmit power levels, different coverage areas, and different impact on interference in wireless network 100. For example, macro BSs may have a high transmit power level (e.g., 5 to 40 Watts) whereas pico BSs, femto BSs, and relay BSs may have lower transmit power levels (e.g., 0.1 to 2 Watts).

A network controller 130 may couple to a set of BSs and may provide coordination and control for these BSs. Network controller 130 may communicate with the BSs via a backhaul. The BSs may also communicate with one another, e.g., directly or indirectly via a wireless or wireline backhaul.

UEs 120 (e.g., 120a, 120b, 120c) may be dispersed throughout wireless network 100, and each UE may be stationary or mobile. A UE may also be referred to as an access terminal, a terminal, a mobile station, a subscriber unit, a station, etc. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communication (MTC) or evolved or enhanced machine-type communication (eMTC) UEs. MTC and eMTC UEs include, for example, robots, drones, remote devices, sensors, meters, monitors, location tags, etc., that may communicate with a base station, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, and/or may be implemented as NB-IoT (narrowband internet of things) devices. Some UEs may be considered a Customer Premises Equipment (CPE). UE 120 may be included inside a housing that houses components of UE 120, such as processor components, memory components, and/or the like.

In general, any number of wireless networks may be deployed in a given geographic area. Each wireless network may support a particular RAT and may operate on one or more frequencies. A RAT may also be referred to as a radio technology, an air interface, and/or the like. A frequency may also be referred to as a carrier, a frequency channel, and/or the like. Each frequency may support a single RAT in a given geographic area in order to avoid interference between wireless networks of different RATs. In some cases, 5G RAT networks may be deployed.

In some examples, access to the air interface may be scheduled, wherein a scheduling entity (e.g., a base station) allocates resources for communication among some or all devices and equipment within the scheduling entity's service area or cell. Within the present disclosure, as discussed further below, the scheduling entity may be responsible for scheduling, assigning, reconfiguring, and releasing resources for one or more subordinate entities. That is, for scheduled communication, subordinate entities utilize resources allocated by the scheduling entity. In some aspects, scheduling of access to the air interface may be adjusted to avoid a collision between downlink transmissions of a first base station and uplink transmissions to a second base station, as may occur during an interference condition.

Base stations are not the only entities that may function as a scheduling entity. That is, in some examples, a UE may function as a scheduling entity, scheduling resources for one or more subordinate entities (e.g., one or more other UEs). In this example, the UE is functioning as a scheduling entity, and other UEs utilize resources scheduled by the UE for wireless communication. A UE may function as a scheduling entity in a peer-to-peer (P2P) network, and/or in a mesh network. In a mesh network example, UEs may optionally communicate directly with one another in addition to communicating with the scheduling entity.

Thus, in a wireless communication network with a scheduled access to time-frequency resources and having a cellular configuration, a P2P configuration, and a mesh configuration, a scheduling entity and one or more subordinate entities may communicate utilizing the scheduled resources.

As indicated above, FIG. 1 is provided merely as an example. Other examples may differ from what is described with regard to FIG. 1.

Figure 2:
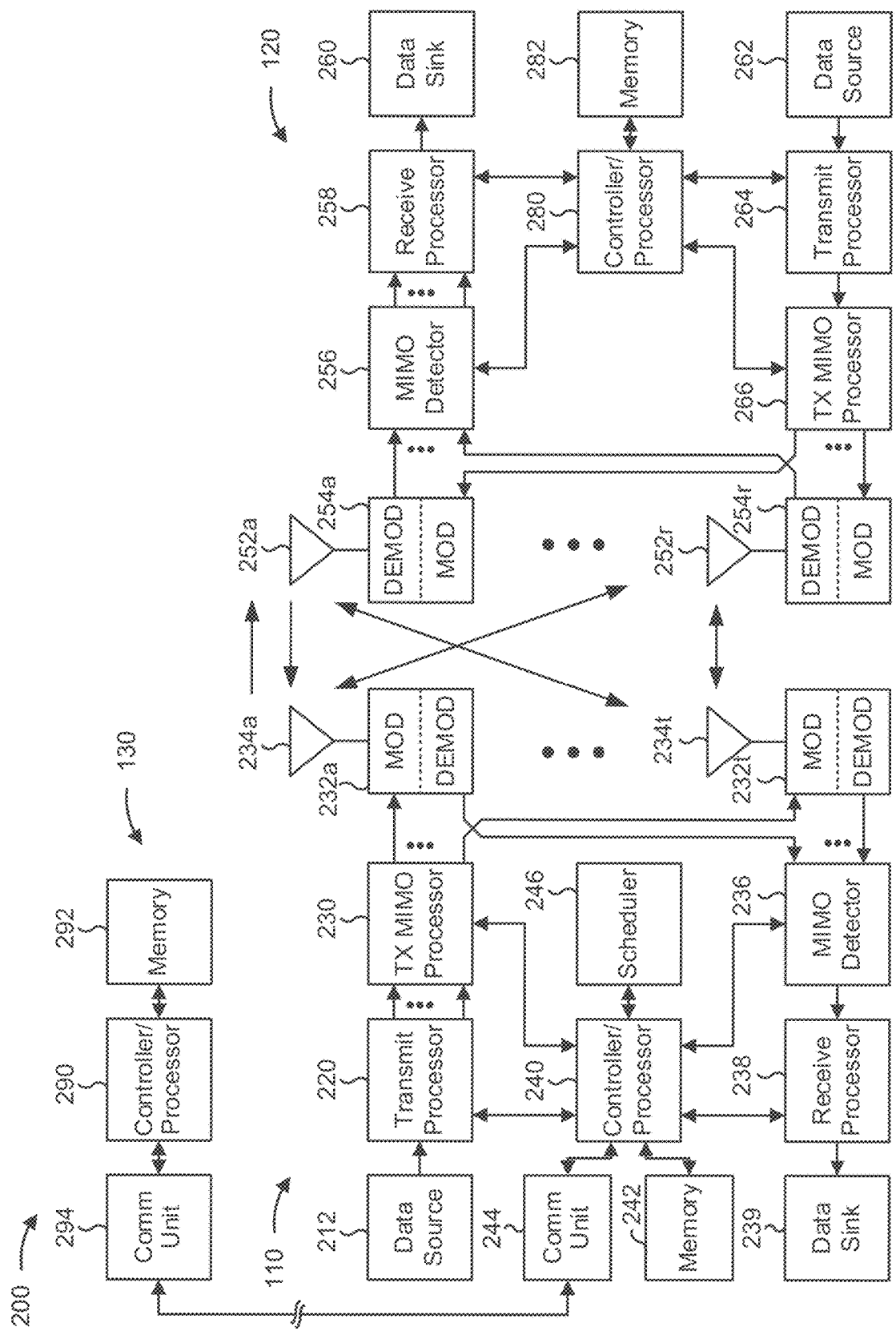
FIG. 2 is a diagram illustrating an example of a base station in communication with a user equipment (UE) in a wireless communication network.

FIG. 2 shows a block diagram 200 of a design of base station 110 and UE 120, which may be one of the base stations and one of the UEs in FIG. 1. Base station 110 may be equipped with T antennas 234a through 234t, and UE 120 may be equipped with R antennas 252a through 252r, where in general T≥1 and R≥1.

At base station 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS selected for the UE, and provide data symbols for all UEs. Transmit processor 220 may also process system information (e.g., for semi-static resource partitioning information (SRPI), and/or the like) and control information (e.g., CQI requests, grants, upper layer signaling, and/or the like) and provide overhead symbols and control symbols. Transmit processor 220 may also generate reference symbols for reference signals (e.g., the CRS) and synchronization signals (e.g., the primary synchronization signal (PSS) and secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. Each modulator 232 may process a respective output symbol stream (e.g., for OFDM and/or the like) to obtain an output sample stream. Each modulator 232 may further process (e.g., convert to analog, amplify, filter, and upconvert) the output sample stream to obtain a downlink signal. T downlink signals from modulators 232a through 232t may be transmitted via T antennas 234a through 234t, respectively. According to various aspects described in more detail below, the synchronization signals can be generated with location encoding to convey additional information. In some aspects, base station 110 may configure communication parameters, such as a transmit angle, a transmit power, and/or the like of an antenna 234 to avoid causing a remote interference condition for another base station 110. Similarly, base station 110 may configure a gain value, a receive angle, and/or the like of antenna 234 to avoid interference caused by another base station 110 in an interference condition.

At UE 120, antennas 252a through 252r may receive the downlink signals from base station 110 and/or other base stations and may provide received signals to demodulators (DEMODs) 254a through 254r, respectively. Each demodulator 254 may condition (e.g., filter, amplify, downconvert, and digitize) a received signal to obtain input samples. Each demodulator 254 may further process the input samples (e.g., for OFDM and/or the like) to obtain received symbols. A MIMO detector 256 may obtain received symbols from all R demodulators 254a through 254r, perform MIMO detection on the received symbols if applicable, and provide detected symbols. A receive (RX) processor 258 may process (e.g., demodulate and decode) the detected symbols, provide decoded data for UE 120 to a data sink 260, and provide decoded control information and system information to a controller/processor 280. A channel processor may determine RSRP, RSSI, RSRQ, CQI, and/or the like.

On the uplink, at UE 120, a transmit processor 264 may receive and process data from a data source 262 and control information (e.g., for reports comprising RSRP, RSSI, RSRQ, CQI, and/or the like) from controller/processor 280. Transmit processor 264 may also generate reference symbols for one or more reference signals. The symbols from transmit processor 264 may be precoded by a TX MIMO processor 266 if applicable, further processed by modulators 254a through 254r (e.g., for DFT-s-OFDM, CP-OFDM, and/or the like), and transmitted to base station 110. At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. Base station 110 may include communication unit 244 and communicate to network controller 130 via communication unit 244. Network controller 130 may include communication unit 294, controller/processor 290, and memory 292.

Controller/processor 240 of base station 110, controller/processor 280 of UE 120, and/or any other component(s) of FIG. 2 may perform one or more techniques associated with RIM reference signal transmission, as described in more detail elsewhere herein. For example, controller/processor 240 of base station 110, controller/processor 280 of UE 120, and/or any other component(s) of FIG. 2 may perform or direct operations of, for example, method 600 of FIG. 6, method 700 of FIG. 7, and/or other processes as described herein. Memories 242 and 282 may store data and program codes for BS 110 and UE 120, respectively. A scheduler 246 may schedule UEs for data transmission on the downlink and/or uplink.

As indicated above, FIG. 2 is provided merely as an example. Other examples may differ from what is described with regard to FIG. 2.

5G may refer to radios configured to operate according to a new air interface (e.g., other than Orthogonal Frequency Divisional Multiple Access (OFDMA)-based air interfaces) or fixed transport layer (e.g., other than Internet Protocol (IP)). In aspects, 5G may utilize OFDM with a CP (herein referred to as cyclic prefix OFDM or CP-OFDM) and/or SC-FDM on the uplink, may utilize CP-OFDM on the downlink and include support for half-duplex operation using TDD. In aspects, 5G may, for example, utilize OFDM with a CP (herein referred to as CP-OFDM) and/or discrete Fourier transform spread orthogonal frequency-division multiplexing (DFT-s-OFDM) on the uplink, may utilize CP-OFDM on the downlink and include support for half-duplex operation using TDD. 5G may include Enhanced Mobile Broadband (eMBB) service targeting wide bandwidth (e.g., 80 megahertz (MHz) and beyond), millimeter wave (mmW) targeting high carrier frequency (e.g., 60 gigahertz (GHz)), massive MTC (mMTC) targeting non-backward compatible MTC techniques, and/or mission critical targeting ultra-reliable low latency communications (URLLC) service.

A single component carrier bandwidth of 100 MHZ may be supported. 5G resource blocks may span 12 sub-carriers with a sub-carrier bandwidth of 75 kilohertz (kHz) over a 0.1 ms duration. Each radio frame may include 50 subframes with a length of 10 ms. Consequently, each subframe may have a length of 0.2 ms. Each subframe may indicate a link direction (e.g., DL or UL) for data transmission and the link direction for each subframe may be dynamically switched. Each subframe may include DL/UL data as well as DL/UL control data.

Beamforming may be supported and beam direction may be dynamically configured. MIMO transmissions with precoding may also be supported. MIMO configurations in the DL may support up to 8 transmit antennas with multi-layer DL transmissions up to 8 streams and up to 2 streams per UE. Multi-layer transmissions with up to 2 streams per UE may be supported. Aggregation of multiple cells may be supported with up to 8 serving cells. Alternatively, 5G may support a different air interface, other than an OFDM-based interface. 5G networks may include entities such central units or distributed units.

The RAN may include a central unit (CU) and distributed units (DUs). A 5G BS (e.g., gNB, 5G Node B, Node B, transmit receive point (TRP), access point (AP)) may correspond to one or multiple BSs. 5G cells can be configured as access cells (ACells) or data only cells (DCells). For example, the RAN (e.g., a central unit or distributed unit) can configure the cells. DCells may be cells used for carrier aggregation or dual connectivity, but not used for initial access, cell selection/reselection, or handover. In some aspects, DCells may not transmit synchronization signals. In some aspects, DCells may transmit synchronization signals. 5G BSs may transmit downlink signals to UEs indicating the cell type. Based at least in part on the cell type indication, the UE may communicate with the 5G BS. For example, the UE may determine 5G BSs to consider for cell selection, access, handover, and/or measurement based at least in part on the indicated cell type.

Figure 3:
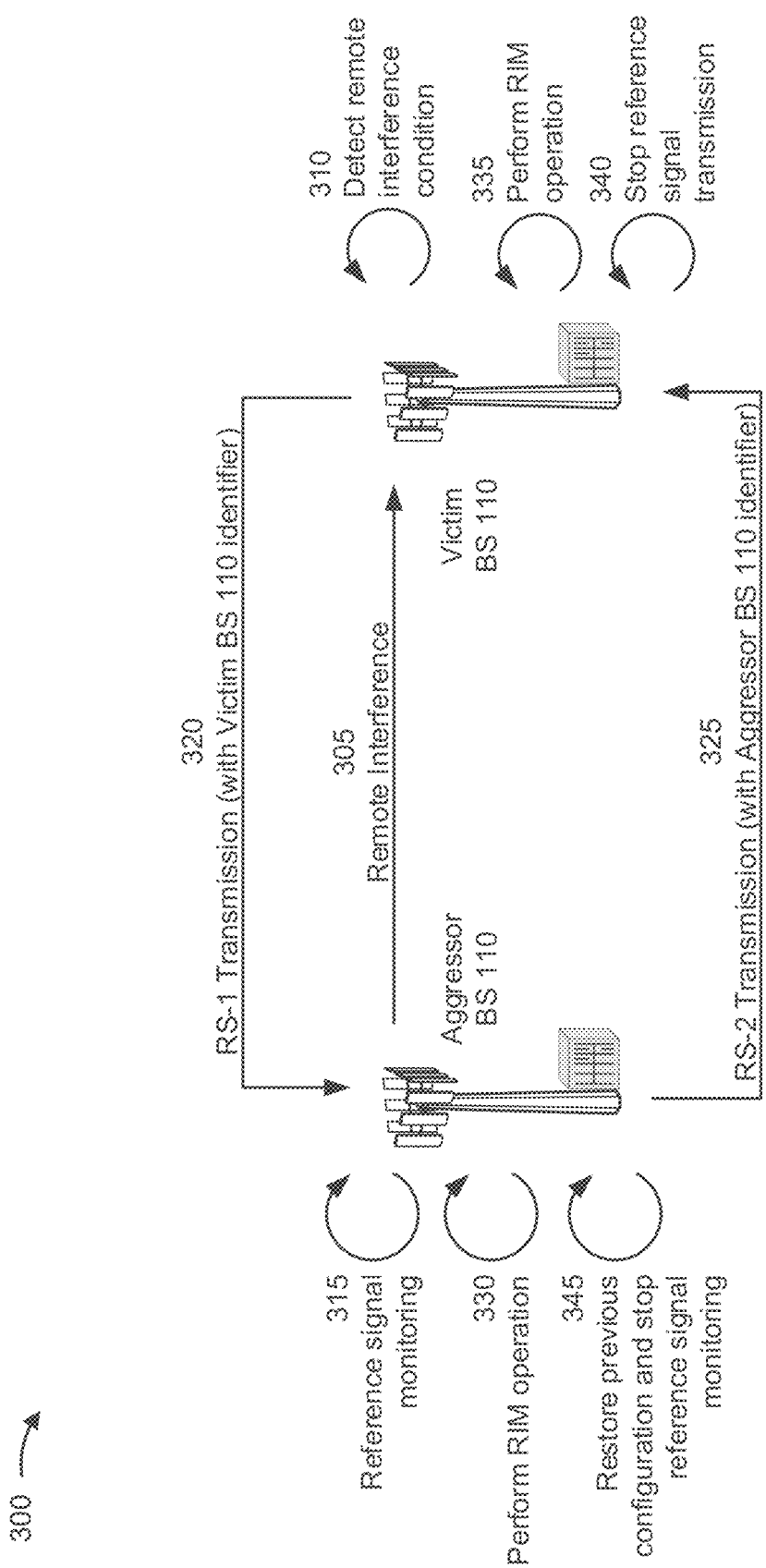
FIG. 3 is a diagram illustrating an example of a framework for RIM reference signal transmission.

FIG. 3 is a diagram illustrating an example 300 of a framework for RIM reference signal transmission. As shown in FIG. 3, example 300 includes an aggressor BS 110 and a victim BS 110.

At 305 and 310, victim BS 110 may receive transmissions subject to a remote interference condition, and may detect the remote interference condition. For example, aggressor BS 110 may transmit data to one or more UEs in a cell of aggressor BS 110 that may cause interference to victim BS 110. In other words, aggressor BS 110 may cause a remote interference condition for victim BS 110. In this case, victim BS 110 may determine that the remote interference condition is occurring based at least in part on the transmissions causing interference to communications of victim BS 110.

At 315, aggressor BS 110 may start reference signal monitoring. For example, aggressor BS 110 may start monitoring for a reference signal transmission from victim BS 110. In some aspects, aggressor BS 110 may monitor for reference signals after detecting the remote interference condition. For example, aggressor BS 110 may begin monitoring for a reference signal associated with a RIM request from victim BS 110 based at least in part on aggressor BS 110 detecting the remote interference condition. Alternatively, aggressor BS 110 may start reference signal monitoring before detecting the remote interference condition. For example, aggressor BS 110 may periodically monitor for reference signals without previously detecting the remote interference condition.

At 320, victim BS 110 may transmit, and aggressor BS 110 may receive a first reference signal (RS-1). The first reference signal may include an identifier of victim BS 110. For example, victim BS 110 may transmit the reference signal to aggressor BS 110, which indicates that a remote interference condition is occurring. In this way, victim BS 110 may trigger aggressor BS 110 to perform a RIM operation. Moreover, victim BS 110 may trigger aggressor BS 110 to transmit a reference signal as a response. The response reference signal may enable victim BS 110 to perform a RIM operation.

In some aspects, victim BS 110 may include an explicit base station identifier in the first reference signal. For example, victim BS 110 may include a complete base station identifier, a portion of a base station identifier, and/or the like in the first reference signal. In this way, victim BS 110 ensures that aggressor BS 110 is enabled to determine an amount of interference attributable to victim BS 110. Moreover, victim BS 110 enables aggressor BS 110 to differentiate interference of victim BS 110 from, for example, one or more other reference signals from one or more other victim BSs or aggressor BSs. Moreover, victim BS 110 enables aggressor BS 110 to select a RIM operation with an improved efficacy relative to selecting a RIM operation without identifying victim BS 110. For example, victim BS 110 may enable aggressor BS 110 to identify a location of victim BS 110 and select a RIM operation associated with directing transmission signals away from the location of victim BS 110 using beamforming.

In some aspects, victim BS 110 may configure the first reference signal to implicitly identify victim BS 110 (without explicitly identifying victim BS 110). For example, victim BS 110 may transmit the first reference signal using a time resource, a frequency resource, a code division multiplexing (CDM) resource, and/or the like allocated for victim BS 110. In this case, aggressor BS 110 may identify victim BS 110 based at least in part on the time resource, the frequency resource, the CDM resource, and/or the like. In some aspects, victim BS 110 may use a combination of an explicit identifier and an implicit identifier to enable aggressor BS 110 to identify victim BS 110. For example, victim BS 110 may transmit the first reference signal using a frequency resource allocated for a plurality of BSs 110 and with a portion of a base station identifier. This may enable aggressor BS 110 to identify victim BS 110 from the plurality of BSs 110.

At 325, aggressor BS 110 may transmit and victim BS 110 may receive a second reference signal (RS-2). The second reference signal may include an identifier of aggressor BS 110. In some aspects, aggressor BS 110 may transmit the second reference signal as a response to receiving the first reference signal from victim BS 110. In this case, the second reference signal may be associated with information identifying aggressor BS 110, such as an explicit identifier, an implicit identifier, a combination of an explicit identifier and an implicit identifier, and/or the like.

In some aspects, victim BS 110 may transmit a plurality of first reference signals and/or aggressor BS 110 may transmit a plurality of second reference signals. For example, victim BS 110 may transmit a first version of the first reference signal that does not include identification information to trigger aggressor BS 110 to start monitoring more extensively for reference signals. In this case, aggressor BS 110 may increase a gain in monitoring for reference signals, increase a size of resources monitored for reference signals, interrupt a transmission to monitor for reference signals, and/or the like. Further, victim BS 110 may transmit a second version of the first reference signal that does include identification information after transmitting the first version of the first reference signal. In this way, aggressor BS 110 may use a first, shorter monitoring period and may transition to using a second longer monitoring period. The first, shorter monitoring period may not enable aggressor BS 110 to receive a base station identifier. The second, longer monitoring period may enable aggressor BS 110 to receive a base station identifier. In this way, victim BS 110 conserves resources of aggressor BS 110. Similarly, aggressor BS 110 may transmit a plurality of second reference signals or a plurality of versions of the second reference signal, thereby enabling ongoing monitoring of the interference condition for victim BS 110.

At 330 and 335, aggressor BS 110 and/or victim BS 110 may perform a RIM operation. For example, aggressor BS 110 and victim BS 110 may each perform RIM operations. In some aspects, aggressor BS 110 and victim BS 110 may perform the RIM operations based at least in part on the first reference signal and/or the second reference signal. In some aspects, aggressor BS 110 and victim BS 110 may perform the RIM operations based at least in part on identifying each other (e.g., using the first reference signal and the second reference signal).

In some aspects, to perform a RIM operation, aggressor BS 110 may alter a transmission parameter. This may mitigate the remote interference condition. For example, aggressor BS 110 may alter a transmit power, a transmit angle, a transmit timing, and/or the like to mitigate the remote interference condition. Similarly, victim BS 110 may alter a gain parameter, a reception angle, a transmit angle, a reception timing, a transmit timing, and/or the like to mitigate the remote interference condition.

In some aspects, victim BS 110 may communicate with aggressor BS 110 to cause aggressor BS 110 to reduce a transmit power by a particular amount. Victim BS 110 and/or aggressor BS 110 may determine the particular amount based at least in part on determining that aggressor BS 110 contributes a particular portion of interference to the remote interference condition, In this case, victim BS 110 may reduce an amount by which aggressor BS 110 is caused to reduce a transmit power, thereby enabling aggressor BS 110 to transmit with a higher power than if victim BS 110 were unable to identify the contribution of aggressor BS 110. This may improve network performance and reduce remote interference.

In some aspects, aggressor BS 110 and victim BS 110 may continue to transmit reference signals. For example, victim BS 110 may detect that the remote interference condition is still occurring after the RIM operation and may transmit another reference signal. Similarly, aggressor BS 110 may transmit another reference signal. In this case, victim BS 110 and/or aggressor BS 110 may continue to perform RIM operations to mitigate the remote interference condition.

At 340 and 345, aggressor BS 110 may restore a previous configuration and stop reference signal monitoring. For example, aggressor BS 110 may determine the remote interference condition is not occurring after a threshold amount of time without receiving a reference signal. In this case, aggressor BS 110 may stop transmission of reference signals to victim BS 110 and/or may stop monitoring for reference signals from victim BS 110. Further, aggressor BS 110 (and/or victim BS 110) may restore one or more communication parameters that was changed during a RIM operation to restore earlier communication operating parameters. In some aspects, aggressor BS 110 (and/or victim BS 110) may maintain one or more communication parameters that was changed during the RIM operation to avoid a reoccurrence of the interference condition.

As indicated above, FIG. 3 is provided as an example. Other examples are possible and may differ from what was described with respect to FIG. 3.

Figure 4:
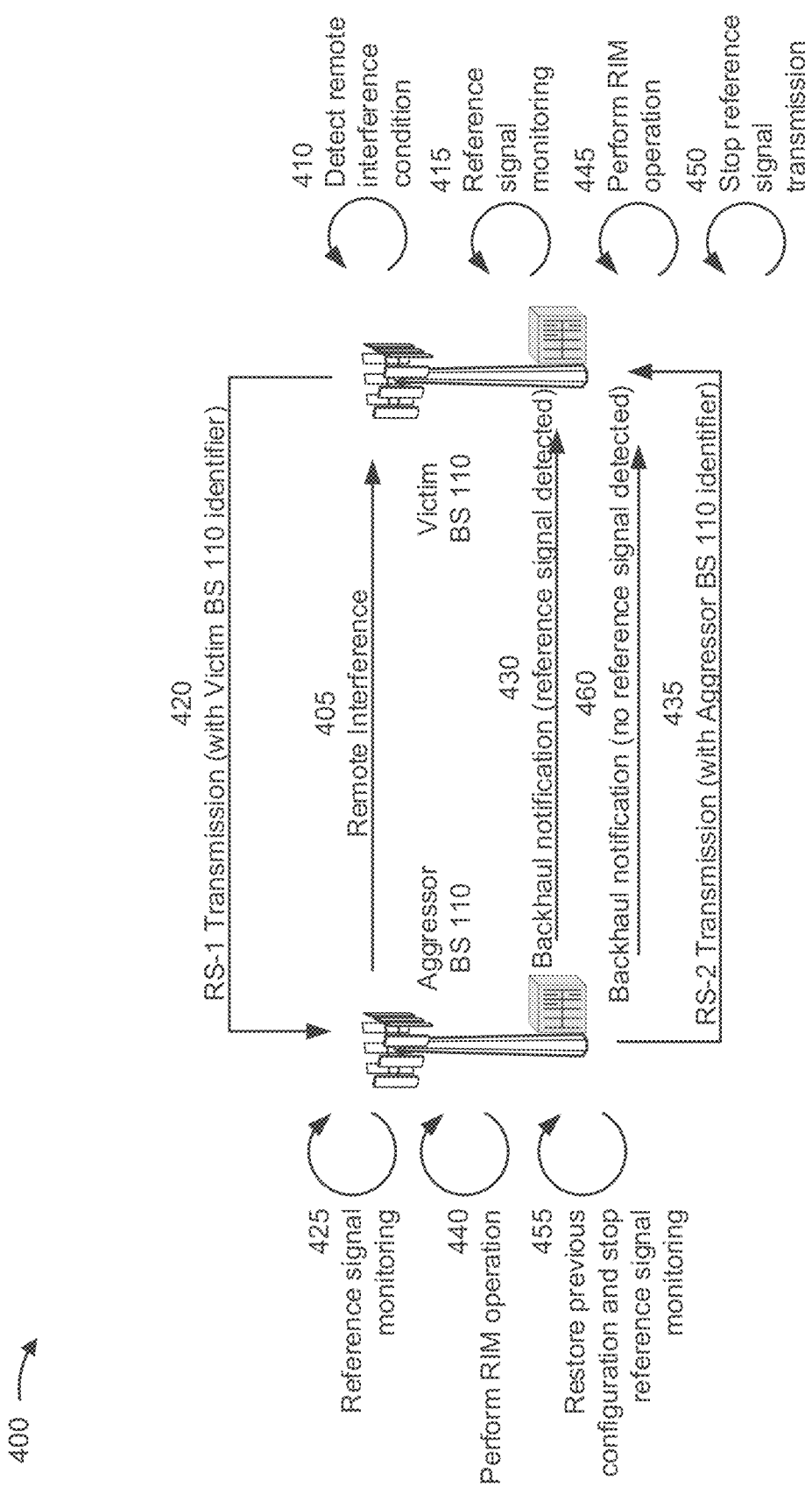
FIG. 4 is a diagram illustrating an example of a framework for RIM reference signal transmission.

FIG. 4 is a diagram illustrating an example 400 of a framework for RIM signal transmission.

At 405 and 410, victim BS 110 may receive transmissions subject to a remote interference condition. Victim BS 110 may detect the remote interference condition based at least in part on receiving the transmissions. For example, aggressor BS 110 may transmit data to one or more UEs in a cell of aggressor BS 110. In this case, transmissions of aggressor BS 110 may interfere with communications of another cell in which victim BS 110 is attempting to communicate. In other words, aggressor BS 110 may transmit information that interferes with communication by victim BS 110. In this case, victim BS 110 may determine that the remote interference condition is occurring.

At 415, 420, and 425, victim BS 110 may start reference signal monitoring. Further, victim BS 110 may transmit a first reference signal and aggressor BS 110 may receive the first reference signal (RS-1). The first reference signal may include information identifying victim BS 110. For example, victim BS 110 may transmit the first reference signal to aggressor BS 110 to indicate to aggressor BS 110 that a remote interference condition is occurring. Additionally, or alternatively, victim BS 110 may transmit the first reference signal to trigger a RIM operation, to trigger aggressor BS 110 to transmit a second reference signal as a response, and/or the like.

At 430, aggressor BS 110 may transmit a backhaul notification to victim BS 110. For example, aggressor BS 110 may transmit the backhaul notification to indicate that the first reference signal is detected. In some aspects, aggressor BS 110 may transmit the backhaul notification to provide information regarding the first reference signal. For example, aggressor BS 110 may provide information identifying an amount of interference detected at aggressor BS 110 based at least in part on the first reference signal. This may enable victim BS 110 to perform a RIM operation. In this way, aggressor BS 110 uses a backhaul connection to increase a reliability of reporting information regarding the first reference signal relative to including the information in a message sent via an access connection.

At 435, aggressor BS 110 may transmit, and victim BS 110 may receive a second reference signal (RS-2). The second reference signal may include an identifier of aggressor BS 110. For example, aggressor BS 110 may transmit a second reference signal to victim BS 110 as a response to receiving the first reference signal from victim BS 110. In this case, the second reference signal may include information identifying aggressor BS 110. In some aspects, victim BS 110 may provide a response message, such as using a backhaul notification.

At 440 and 445, aggressor BS 110 and/or victim BS 110 may perform a RIM operation. For example, aggressor BS 110 and victim BS 110 may perform the RIM operation using information included in the first reference signal and/or the second reference signal. Additionally, or alternatively, victim BS 110 and/or aggressor BS 110 may perform the RIM operation based at least in part on the information identifying victim BS 110 and aggressor BS 110 in the first reference signal and the second reference signal, respectively. In some aspects, to perform the RIM operation, aggressor BS 110 and/or victim BS 110 may alter a communication parameter to mitigate the remote interference condition.

At 450, 455, and 460, victim BS 110 may stop transmission of reference signals to aggressor BS 110. Further, aggressor BS 110 may stop reference signal monitoring and restore a previous transmission configuration. Further, aggressor BS 110 may provide a notification to victim BS 110. In this case, aggressor BS 110 may provide the notification via a backhaul to indicate that no reference signal is detected within a threshold period of time. Further, aggressor BS 110 may provide the notification to indicate that aggressor BS 110 is to restore a previous transmission configuration. In this way, aggressor BS 110 avoids prematurely stopping RIM operations (e.g., because of failing to receive reference signals as a result of the interference condition) by using the backhaul to indicate whether aggressor BS 110 is to stop RIM operations. This may enable victim BS 110 to confirm whether the interference condition is no longer occurring.

As indicated above, FIG. 4 is provided as an example. Other examples are possible and may differ from what was described with respect to FIG. 4.

Figure 5:
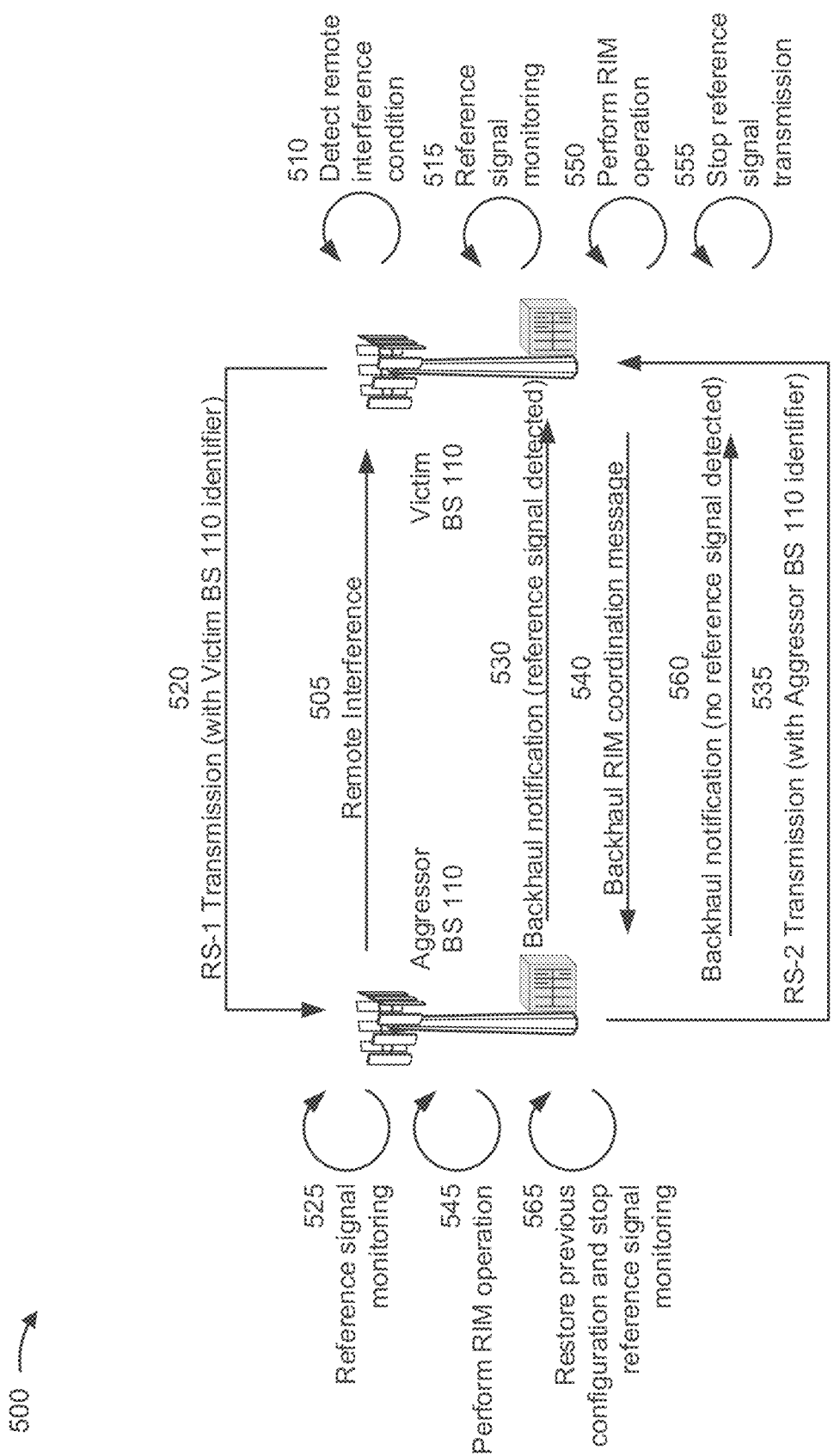
FIG. 5 is a diagram illustrating an example of a framework for RIM reference signal transmission.

FIG. 5 is a diagram illustrating an example 500 of a framework for RIM reference signal transmission.

At 505 and 510, victim BS 110 may receive transmissions subject to a remote interference condition. Further, victim BS 110 may detect the remote interference condition based at least in part on receiving the transmissions. For example, aggressor BS 110 may transmit data to one or more UEs in a cell of aggressor BS 110 and the transmissions of aggressor BS 110 may interfere with communications by victim BS 110. In this case, victim BS 110 may determine, based at least in part on the transmissions causing interference to communications of victim BS 110 that the remote interference condition is occurring.

At 515, 520, and 525, victim BS 110 may start reference signal monitoring. Further, victim BS 110 may transmit a first reference signal. Further, aggressor BS 110 may receive the first reference signal (RS-1). For example, victim BS 110 may transmit the first reference signal to aggressor BS 110 to indicate to aggressor BS 110 that a remote interference condition is occurring. Additionally, or alternatively, victim BS 110 may transmit the first reference signal to trigger a RIM operation, to trigger aggressor BS 110 to transmit a second reference signal as a response, and/or the like. In this case, the first reference signal may be associated with information identifying victim BS 110, such as an explicit identifier, an implicit identifier, and/or the like.

At 530, aggressor BS 110 may transmit a backhaul notification to victim BS 110. For example, aggressor BS 110 may transmit the backhaul notification to indicate that the first reference signal is detected. In some aspects, aggressor BS 110 may transmit the backhaul notification to provide information regarding the first reference signal. For example, aggressor BS 110 may provide information associated with the interference condition, such as an amount of interference detected at aggressor BS 110 based at least in part on the first reference signal, which may enable victim BS 110 to perform a RIM operation.

At 535, aggressor BS 110 may transmit, and victim BS 110 may receive a second reference signal (RS-2). The second reference signal may include an identifier of aggressor BS 110. For example, aggressor BS 110 may transmit the second reference signal to victim BS 110 based at least in part on receiving the first reference signal. In this case, the second reference signal may be associated with information identifying aggressor BS 110. In some aspects, the first reference signal and the second reference may convey identifiers that identify respective transmitting BSs 110. For example, aggressor BS 110 may transmit the second reference signal to convey an identifier of aggressor BS 110 and victim BS 110 may transmit the first reference signal to convey an identifier of victim BS 110.

At 540, victim BS 110 may transmit a backhaul RIM coordination message. For example, victim BS 110 may transmit information identifying a result of aggressor BS 110 transmitting the second reference signal. In this case, victim BS 110 may indicate an amount of interference attributable to aggressor BS 110. Additionally, or alternatively, victim BS 110 may transmit an instruction regarding altering a communication configuration in connection with a RIM operation, to enable aggressor BS 110 to alter the communication configuration. In some aspects, aggressor BS 110 may transmit a response message via the backhaul to indicate a RIM operation that aggressor BS 110 is to perform. Additionally, or alternatively, aggressor BS 110 may transmit the response message to acknowledge receipt of the backhaul RIM coordination message. In this way, victim BS 110 improves a likelihood of success of a RIM operation relative to uncoordinated RIM operations relative to using messages transmitted via an access network transmission. Moreover, victim BS 110 improves a reliability of RIM operation coordination relative to using messages transmitted via an access network transmission.

At 545 and 550, aggressor BS 110 and/or victim BS 110 may perform a RIM operation. For example, using the first reference signal and the second reference signal, and based at least in part on the information identifying victim BS 110 and aggressor BS 110 in the first reference signal and the second reference signal, respectively, and the backhaul RIM coordination message, aggressor BS 110 and victim BS 110 may perform the RIM operation.

At 555, 560, and 565, victim BS 110 may stop transmission of reference signals to aggressor BS 110. Further, aggressor BS 110 may stop reference signal monitoring and restore a previous transmission configuration. Further, aggressor BS 110 may provide a backhaul notification to victim BS 110. Additionally, or alternatively, aggressor BS 110 may maintain a changed transmission configuration. In this case, aggressor BS 110 may provide the notification via a backhaul to indicate that no reference signal is detected within a threshold period of time, and that aggressor BS 110 is to restore a previous transmission configuration.

As indicated above, FIG. 5 is provided as an example. Other examples are possible and may differ from what was described with respect to FIG. 5.

Figure 6:
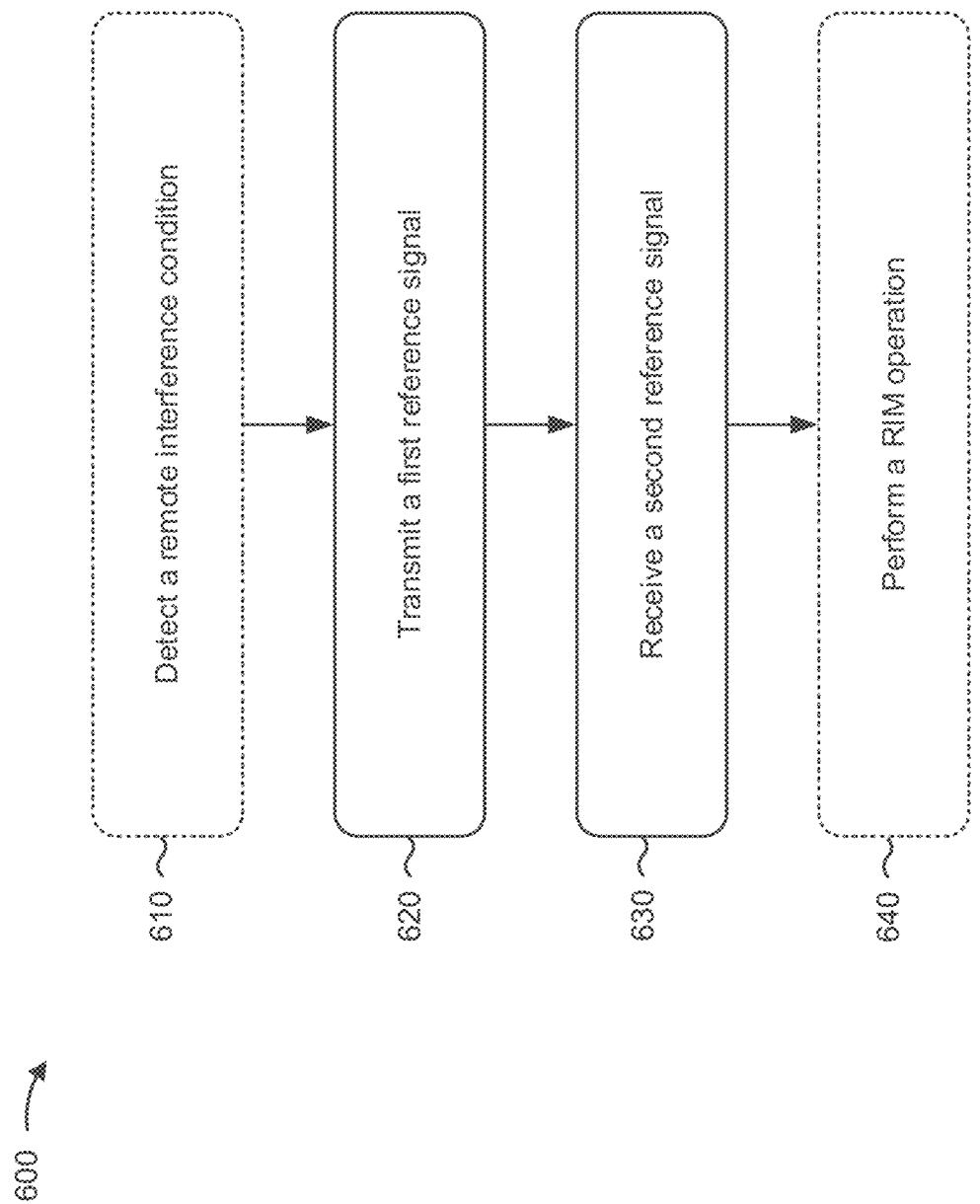
FIG. 6 is a flow chart of a method of wireless communication.

FIG. 6 is a flow chart of a method 600 of wireless communication. The method may be performed by a first base station (BS) (e.g., the BS 110, the aggressor BS 110, the victim BS 110, the apparatus 802/802', the base station 850, and/or the like).

At 610, in some aspects, the first base station may detect a remote interference condition. For example, the first base station (e.g., using antenna 234, DEMOD 232, MIMO detector 236, receive processor 238, controller/processor 240, and/or the like) may detect the remote interference condition, as described in more detail above. In this case, the first base station may detect interference in a communication with, for example, a user equipment, and may be triggered to perform a RIM operation.

At 620, the first base station may transmit a first reference signal. For example, the first base station (e.g., using controller/processor 240, transmit processor 220, TX MIMO processor 230, MOD 232, antenna 234, and/or the like) may transmit, based at least in part on an occurrence of a remote interference condition, a first reference signal, as described in more detail above. In some aspects, the first reference signal corresponds to a first device identifier identifying the first base station (e.g., a base station identifier). In this way, the first base station, which may be a victim base station, may trigger a RIM operation for the aggressor base station, and may trigger the aggressor base station to transmit a second reference signal as a response to enable the first base station to perform a RIM operation.

At 630, the first base station may receive a second reference signal. For example, the first base station (e.g., using antenna 234, DEMOD 232, MIMO detector 236, receive processor 238, controller/processor 240, and/or the like) may receive, after transmitting the first reference signal, a second reference signal, as described in more detail above. In some aspects, the second reference signal corresponds to a second device identifier identifying a second base station. In this way, the first base station may determine one or more parameter value changes as a RIM operation, to enable a reduction in interference.

At 640, in some aspects, the first base station may perform a RIM operation. For example, the first base station (e.g., using antenna 234, DEMOD 232, MIMO detector 236, receive processor 238, controller/processor 240, and/or the like) may perform the RIM operation, as described in more detail above. In this case, the first base station may adjust a communication parameter value, may communicate with the second base station to cause the second base station to adjust a communication parameter value, and/or the like.

Method 600 may include additional aspects, such as any single aspect or any combination of aspects described below and/or in connection with one or more other processes described elsewhere herein.

In a first aspect, the first base station is configured to perform a remote interference management operation based at least in part on the second reference signal.

In a second aspect, alone or in combination with the first aspect, the first device identifier is at least a portion of a base station identifier identifying the first base station.

In a third aspect, alone or in combination with one or more of the first through second aspects, the second device identifier is at least a portion of a base station identifier identifying the second base station.

In a fourth aspect, alone or in combination with one or more of the first through third aspects, a configuration of the first reference signal corresponds to the first device identifier, and wherein the configuration of the first reference signal relates to at least one of a time resource allocated to the first reference signal, a frequency resource allocated to the first reference signal, or a code division multiplexing resource allocated to the first reference signal.

In a fifth aspect, alone or in combination with one or more of the first through fourth aspects, a configuration of the second reference signal corresponds to the second device identifier, and wherein the configuration of the second reference signal is at least one of a time resource allocated to the second reference signal, a frequency resource allocated to the second reference signal, or a code division multiplexing resource allocated to the second reference signal.

In a sixth aspect, alone or in combination with one or more of the first through fifth aspects, method 700 includes determining, based at least in part on the second reference signal, at least one of a presence of remote interference, an estimated quantity of interfered symbols, or an interference power estimation.

In a seventh aspect, alone or in combination with one or more of the first through sixth aspects, the first reference signal is generated based at least in part on the first device identifier.

In an eighth aspect, alone or in combination with one or more of the first through seventh aspects, the second reference signal is generated based at least in part on the second device identifier.

In a ninth aspect, alone or in combination with one or more of the first through eighth aspects, the first base station is configured to transmit a third reference signal that does not include a device identifier.

In a tenth aspect, alone or in combination with one or more of the first through ninth aspects, the first base station is configured to receive a fourth reference signal that does not include a device identifier.

In an eleventh aspect, alone or in combination with one or more of the first through tenth aspects, the first base station is configured to receive a backhaul message from the second base station indicating reception of the first reference signal.

In a twelfth aspect, alone or in combination with one or more of the first through eleventh aspects, the first base station is configured to receive a backhaul message from the second base station indicating a threshold period of time has elapsed since a last reference signal was received.

In a thirteenth aspect, alone or in combination with one or more of the first through twelfth aspects, the first base station is configured to end transmission of reference signals based at least in part on detecting an end to the remote interference condition.

Although FIG. 6 shows example blocks of a method of wireless communication, in some aspects, the method may include additional blocks, fewer blocks, different blocks, or differently arranged blocks than those shown in FIG. 6. Additionally, or alternatively, two or more blocks shown in FIG. 6 may be performed in parallel.

Figure 7:
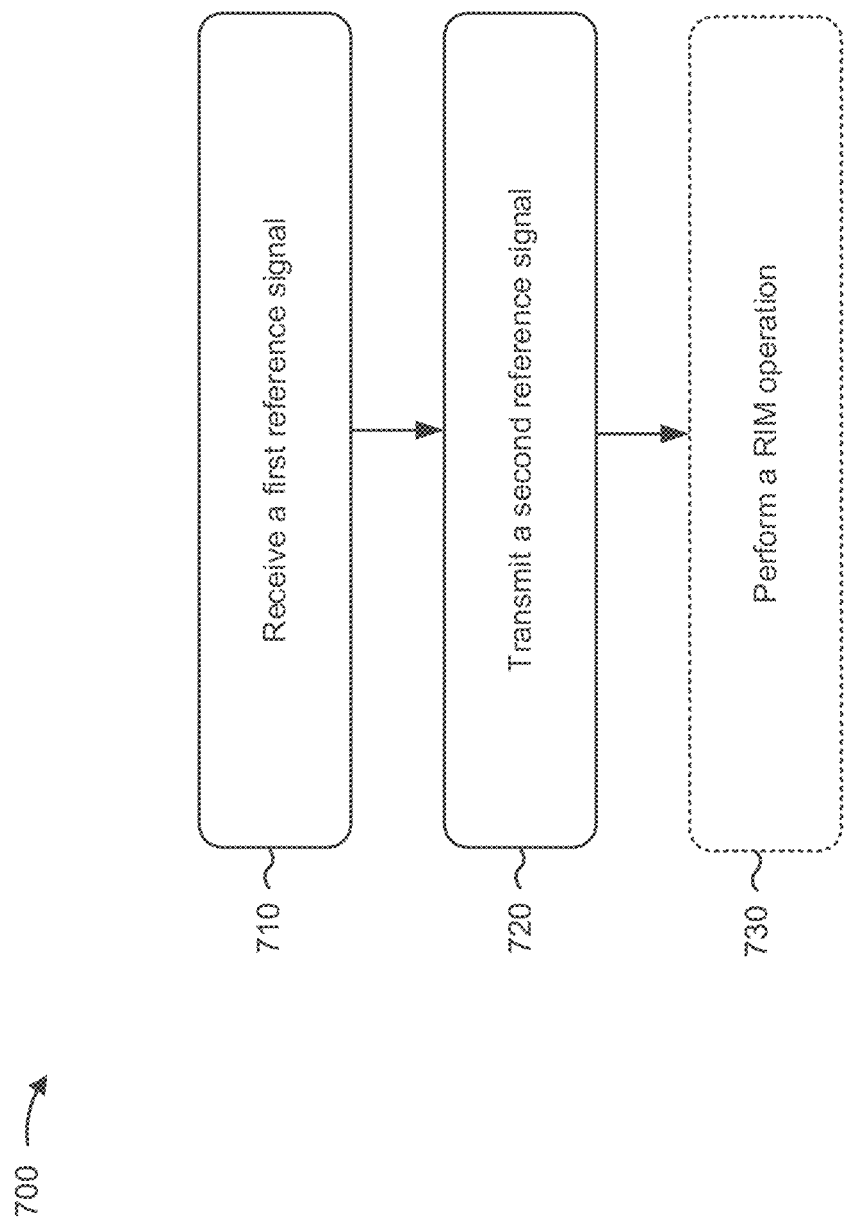
FIG. 7 is a flow chart of a method of wireless communication.

FIG. 7 is a flow chart of a method 700 of wireless communication. The method may be performed by a first base station (BS) (e.g., the BS 110, the aggressor BS 110, the victim BS 110, the apparatus 802/802', the base station 850, and/or the like).

At 710, the first base station may receive a first reference signal. For example, the first base station (e.g., using antenna 234, DEMOD 232, MIMO detector 236, receive processor 238, controller/processor 240, and/or the like) may receive a first reference signal associated with a remote interference condition, as described in more detail above. In some aspects, the first reference signal corresponds to a first device identifier identifying a second base station. In this case, the first base station may be triggered to transmit a second reference signal as a response, and may be triggered to perform a RIM operation as a response to mitigate the remote interference condition.

At 720, the first base station may transmit a second reference signal. For example, the BS (e.g., using controller/processor 240, transmit processor 220, TX MIMO processor 230, MOD 232, antenna 234, and/or the like) may transmit, after receiving the first reference signal, a second reference signal as a response to receiving the first reference signal, as described in more detail above. In some aspects, the second reference signal corresponds to a second device identifier identifying the first base station. In this case, the BS may include the second device identifier in the second reference signal to enable the second base station to determine a contribution of the first base station to the interference condition, thereby improving a likelihood that a RIM operation is successful at mitigating the interference condition.

At 730, in some aspects, the first base station may perform a RIM operation. For example, the BS (e.g., using controller/processor 240, transmit processor 220, TX MIMO processor 230, MOD 232, antenna 234, and/or the like) may perform the RIM operation, as described in more detail above. In this case, the first base station may perform the RIM operation based at least in part on a measurement of the first reference signal, based at least in part on receiving information from the second base station (e.g., information associated with a measurement of the second reference signal by the second base station), and/or the like.

Method 700 may include additional aspects, such as any single aspect or any combination of aspects described below and/or in connection with one or more other processes described elsewhere herein.

In a first aspect, the first base station is configured to perform a remote interference management operation based at least in part on the first reference signal.

In a second aspect, alone or in combination with the first aspect, the first device identifier is at least a portion of a base station identifier identifying the second base station.

In a third aspect, alone or in combination with any of the first through second aspects, the second device identifier is at least a portion of a base station identifier identifying the first base station.

In a fourth aspect, alone or in combination with any of the first through third aspects, wherein a configuration of the first reference signal corresponds to the first device identifier, and wherein the configuration of the first reference signal is at least one of a time resource allocated to the first reference signal, a frequency resource allocated to the first reference signal, or a code division multiplexing resource allocated to the first reference signal.

In a fifth aspect, alone or in combination with any of the first through fourth aspects, a configuration of the second reference signal corresponds to the second device identifier, and wherein the configuration indicated by the second reference signal is at least one of a time resource allocated to the second reference signal, a frequency resource allocated to the second reference signal, or a code division multiplexing resource allocated to the second reference signal.

In a sixth aspect, alone or in combination with any of the first through fifth aspects, method 700 includes determining, based at least in part on the second reference signal, at least one of: a presence of remote interference, an estimated quantity of interfered symbols, or an interference power estimation.

In a seventh aspect, alone or in combination with any of the first through sixth aspects, the first reference signal is generated based at least in part on the first device identifier.

In an eighth aspect, alone or in combination with any of the first through seventh aspects, the second reference signal is generated based at least in part on the second device identifier.

In a ninth aspect, alone or in combination with any of the first through eighth aspects, the first base station is configured to transmit a third reference signal that does not include a device identifier.

In a tenth aspect, alone or in combination with any of the first through ninth aspects, the first base station is configured to receive a third reference signal that does not include a device identifier.

In an eleventh aspect, alone or in combination with any of the first through tenth aspects, the first base station is configured to transmit a backhaul message to the second base station indicating reception of the first reference signal.

In a twelfth aspect, alone or in combination with any of the first through eleventh aspects, the first base station is configured to transmit a backhaul message to the second base station indicating a threshold period of time has elapsed since a last reference signal was received.

In a thirteenth aspect, alone or in combination with any of the first through twelfth aspects, the first base station is configured to end transmission of reference signals based at least in part on detecting an end to the remote interference condition.

Although FIG. 7 shows example blocks of a method of wireless communication, in some aspects, the method may include additional blocks, fewer blocks, different blocks, or differently arranged blocks than those shown in FIG. 7. Additionally, or alternatively, two or more blocks shown in FIG. 7 may be performed in parallel.

Figure 8:
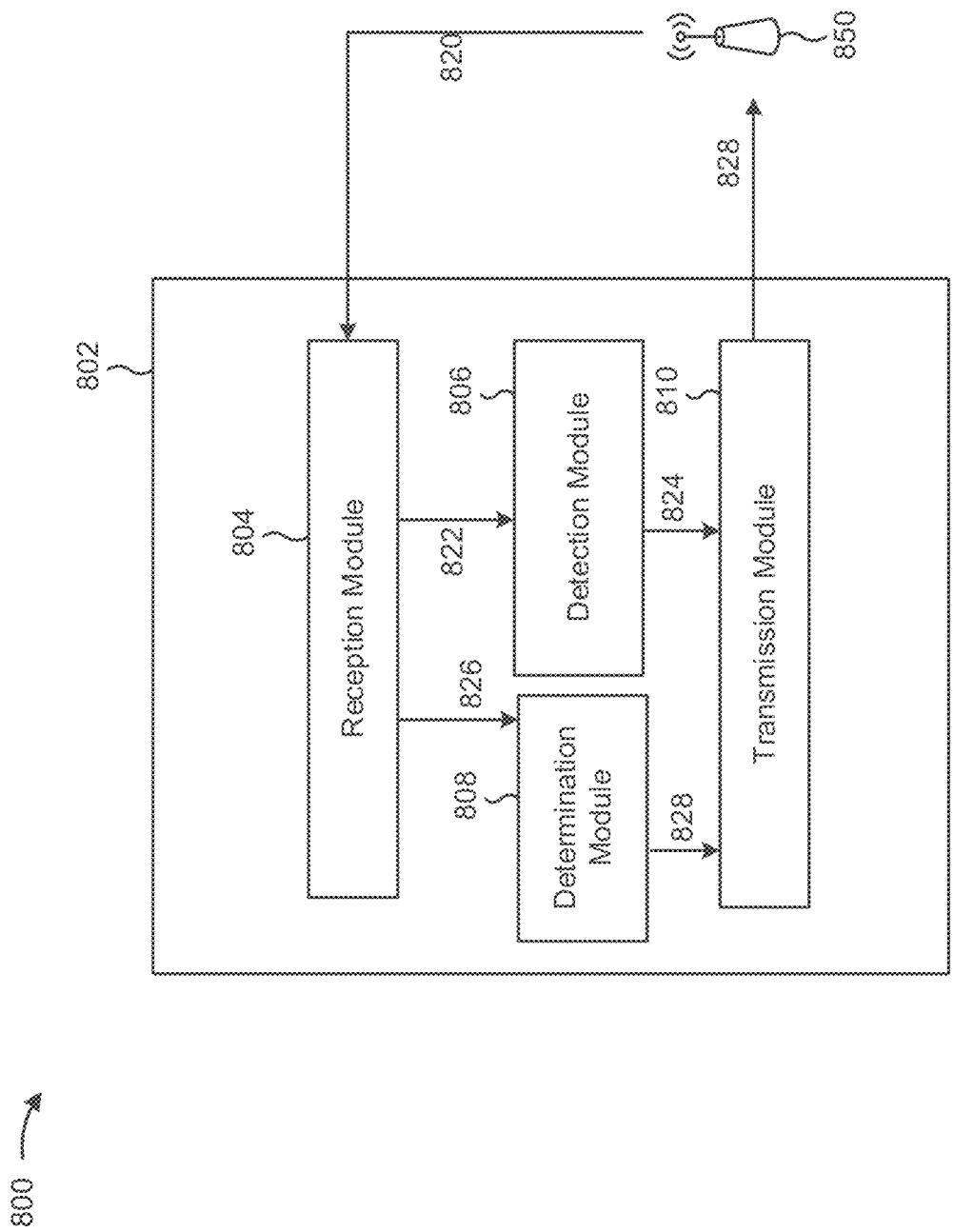
FIG. 8 is a conceptual data flow diagram illustrating the data flow between different modules/means/components in an example apparatus.

FIG. 8 is a conceptual data flow diagram 800 illustrating the data flow between different modules/means/components in an example apparatus 802. The apparatus 802 may be a base station. In some aspects, the apparatus 802 includes a reception module 804, a detection module 806, a determination module 808, and/or a transmission module 810.

The reception module 804 may receive, from base station 850 and as data 820, information associated with remote interference. For example, the reception module 804 may receive data 820 that may indicate an occurrence of a remote interference condition, such as based on the data 820 being incomplete and/or corrupted. In some aspects, the reception module 804 may receive a reference signal including an identifier of base station 850, which may enable the apparatus 802 to determine a contribution of base station 850 to a remote interference condition.

The detection module 806 may receive, from the reception module 804 and as data 822, information associated with detecting an occurrence of a remote interference condition. For example, the detection module 806 may receive information identifying a channel condition, a characteristic of data received by the reception module 804, and/or the like. In this case, the detection module 806 may determine that the remote interference condition is occurring and may trigger transmission of a reference signal to enable a RIM operation to be performed by the apparatus 802, the base station 850, and/or the like.

The determination module 808 may receive, from the reception module 804 and as data 826, information associated with determining a characteristic of a communication. For example, the determination module may determine a presence of remote interference, an estimated quantity of interfered symbols, an interference power estimation, and/or the like.

The transmission module 810 may receive, from the detection module 806 and as data 824 and/or from determination module 808 and as data 828, information associated with an occurrence of a remote interference condition. For example, the transmission module 810 may receive information indicating that a remote interference condition is occurring and may transmit data 830 to base station 850, such as a reference signal including information identifying the apparatus 802, an instruction to perform a RIM operation, a confirmation that the reception module 804 received a reference signal from the base station 850, and/or the like.

The apparatus may include additional modules that perform each of the blocks of the algorithm in the aforementioned method 600 of FIG. 6, method 700 of FIG. 7, and/or the like. As such, each block in the aforementioned method 600 of FIG. 6, method 700 of FIG. 7, and/or the like may be performed by a module and the apparatus may include one or more of those modules. The modules may be one or more hardware components specifically configured to carry out the stated processes/algorithm, implemented by a processor configured to perform the stated processes/algorithm, stored within a computer-readable medium for implementation by a processor, or some combination thereof.

The number and arrangement of modules shown in FIG. 8 are provided as an example. In practice, there may be additional modules, fewer modules, different modules, or differently arranged modules than those shown in FIG. 8. Furthermore, two or more modules shown in FIG. 8 may be implemented within a single module, or a single module shown in FIG. 8 may be implemented as multiple, distributed modules. Additionally, or alternatively, a set of modules (e.g., one or more modules) shown in FIG. 8 may perform one or more functions described as being performed by another set of modules shown in FIG. 8.

Figure 9:
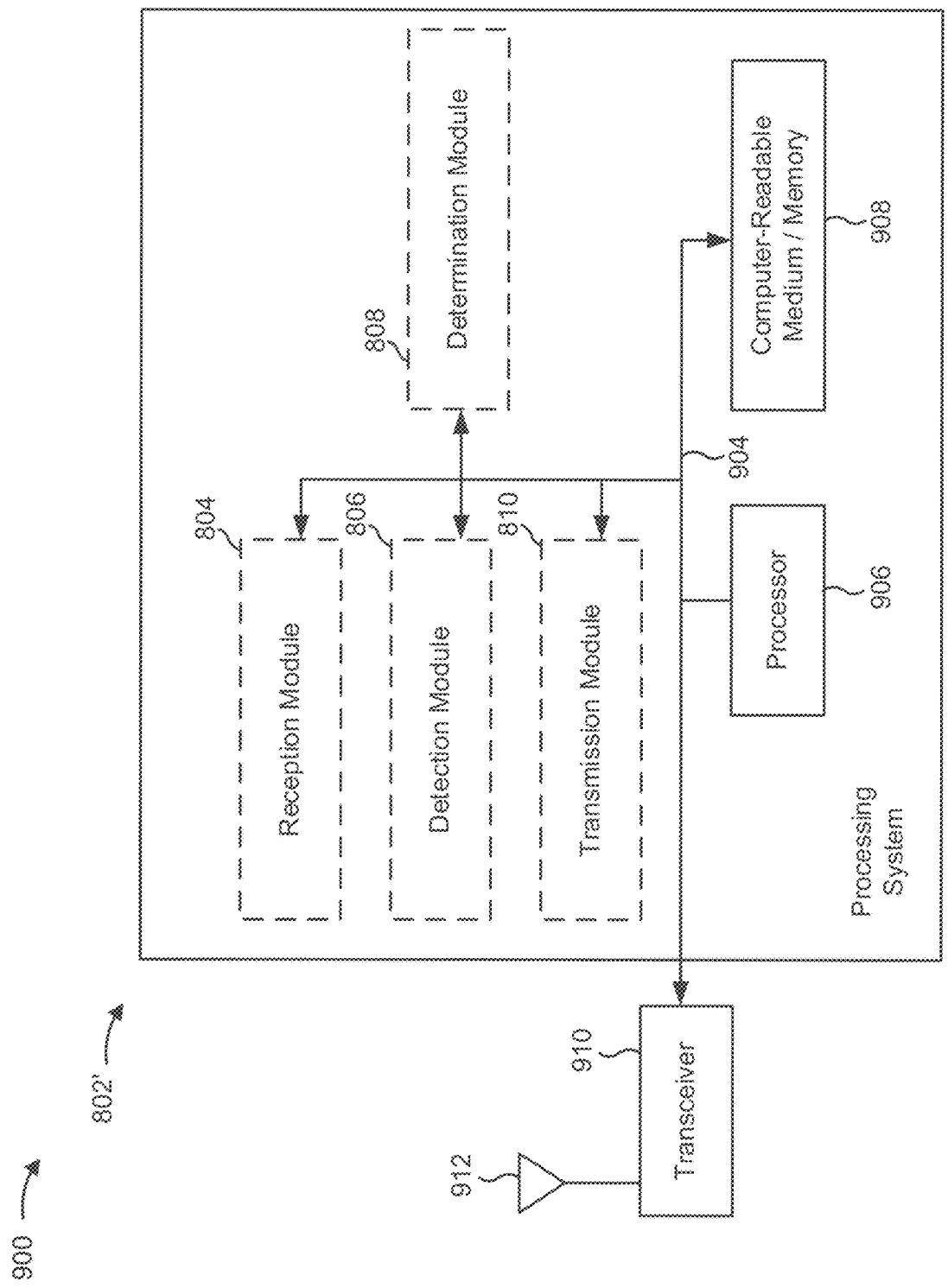
FIG. 9 is a diagram illustrating an example of a hardware implementation for an apparatus employing a processing system.

FIG. 9 is a diagram 900 illustrating an example of a hardware implementation for an apparatus 802' employing a processing system 902. The apparatus 802' may be BS.

The processing system 902 may be implemented with a bus architecture, represented generally by the bus 904. The bus 904 may include any number of interconnecting buses and bridges depending on the specific application of the processing system 902 and the overall design constraints. The bus 904 links together various circuits including one or more processors and/or hardware modules, represented by the processor 906, the modules 804, 806, 808, 810, and the computer-readable medium/memory 908. The bus 904 may also link various other circuits such as timing sources, peripherals, voltage regulators, and power management circuits, which are well known in the art, and therefore, will not be described any further.

The processing system 902 may be coupled to a transceiver 910. The transceiver 910 is coupled to one or more antennas 912. The transceiver 910 provides a means for communicating with various other apparatus over a transmission medium. The transceiver 910 receives a signal from the one or more antennas 912, extracts information from the received signal, and provides the extracted information to the processing system 902, specifically the reception module 804. In addition, the transceiver 910 receives information from the processing system 902, specifically the transmission module 810, and based at least in part on the received information, generates a signal to be applied to the one or more antennas 912. The processing system 902 includes a processor 906 coupled to a computer-readable medium/memory 908. The processor 906 is responsible for general processing, including the execution of software stored on the computer-readable medium/memory 908. The software, when executed by the processor 906, causes the processing system 902 to perform the various functions described supra for any particular apparatus. The computer-readable medium/memory 908 may also be used for storing data that is manipulated by the processor 906 when executing software. The processing system further includes at least one of the modules 804, 806, 808, and 810. The modules may be software modules running in the processor 906, resident/stored in the computer-readable medium/memory 908, one or more hardware modules coupled to the processor 906, or some combination thereof. The processing system 902 may be a component of the BS 110 and may include the memory 242 and/or at least one of the TX MIMO processor 230, the RX processor 238, and/or the controller/processor 240.

In some aspects, the apparatus 802/802' for wireless communication includes means for transmitting, based at least in part on an occurrence of a remote interference condition, a first reference signal, wherein the first reference signal corresponds to a first device identifier identifying the apparatus 802/802'; means for receiving, after transmitting the first reference signal, a second reference signal, wherein the second reference signal corresponds to a second device identifier identifying a base station; and/or the like. In some aspects, the apparatus 802/802' for wireless communication includes means for receiving a first reference signal associated with a remote interference condition, wherein the first reference signal corresponds to a first device identifier identifying a base station; means for transmitting, after receiving the first reference signal, a second reference signal as a response to receiving the first reference signal, wherein the second reference signal corresponds to a second device identifier identifying the apparatus 802/802'; and/or the like. The aforementioned means may be one or more of the aforementioned modules of the apparatus 802 and/or the processing system 902 of the apparatus 802' configured to perform the functions recited by the aforementioned means. As described supra, the processing system 902 may include the TX MIMO processor 230, the receive processor 238, and/or the controller/processor 240. As such, in one configuration, the aforementioned means may be the TX MIMO processor 230, the receive processor 238, and/or the controller/processor 240 configured to perform the functions recited by the aforementioned means.

FIG. 9 is provided as an example. Other examples are possible and may differ from what was described in connection with FIG. 9.

It is understood that the specific order or hierarchy of blocks in the processes/flow charts disclosed is an illustration of example approaches. Based upon design preferences, it is understood that the specific order or hierarchy of blocks in the processes/flow charts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "at least one of A, B, and C," and "A, B, C, or any combination thereof" include any combination of A, B, and/or C, and may include multiples of A, multiples of B, or multiples of C. Specifically, combinations such as "at least one of A, B, or C," "at least one of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed as a means plus function unless the element is expressly recited using the phrase "means for."

What is claimed is:

1. A method of wireless communication performed by a first base station, comprising:
   transmitting a first reference signal associated with an occurrence of a remote interference condition, wherein the first reference signal corresponds to a first device identifier identifying the first base station; and
   receiving, after transmitting the first reference signal, a second reference signal including information indicating a second device identifier identifying a second base station.

2. The method of claim 1, wherein the first base station is configured to perform a remote interference management operation based at least in part on the second reference signal.

3. The method of claim 1, wherein the first device identifier is at least a portion of a base station identifier identifying the first base station.

4. The method of claim 1, wherein the second device identifier is at least a portion of a base station identifier identifying the second base station.

5. The method of claim 1, wherein a configuration of the first reference signal corresponds to the first device identifier, and
   wherein the configuration of the first reference signal includes at least one of:
      a time resource allocated to the first reference signal,
      a frequency resource allocated to the first reference signal, or
      a code division multiplexing resource allocated to the first reference signal.

6. The method of claim 1, wherein a configuration of the second reference signal corresponds to the second device identifier, and
   wherein the configuration of the second reference signal includes at least one of:
      a time resource allocated to the second reference signal,
      a frequency resource allocated to the second reference signal, or
      a code division multiplexing resource allocated to the second reference signal.

7. The method of claim 1, further comprising:
   determining, based at least in part on the second reference signal, at least one of:
      a presence of remote interference,
      an estimated quantity of interfered symbols, or
      an interference power estimation.

8. The method of claim 1, wherein the first reference signal is generated based at least in part on the first device identifier.

9. The method of claim 1, wherein the second reference signal is generated based at least in part on the second device identifier.

10. The method of claim 1, wherein the first base station is configured to receive a backhaul message from the second base station indicating reception of the first reference signal.

11. The method of claim 1, wherein the first base station is configured to receive a backhaul message from the second base station indicating a threshold period of time has elapsed since a last reference signal was received.

12. The method of claim 1, wherein the first base station is configured to end transmission of reference signals based at least in part on detecting an end to the remote interference condition.

13. A method of wireless communication performed by a first base station, comprising:
   receiving a first reference signal associated with an occurence of a remote interference condition, wherein the first reference signal corresponds to a first device identifier identifying a second base station; and
   transmitting, after receiving the first reference signal, a second reference signal as a response to receiving the first reference signal, wherein the second reference signal includes information indicating a second device identifier identifying the first base station.

14. The method of claim 13, wherein the first base station is configured to perform a remote interference management operation based at least in part on the first reference signal.

15. The method of claim 13, wherein the first device identifier is at least a portion of a base station identifier identifying the second base station.

16. The method of claim 13, wherein the second device identifier corresponds to at least a portion of a base station identifier identifying the first base station.

17. The method of claim 13, wherein a configuration of the first reference signal corresponds to the first device identifier, and
   wherein the configuration of the first reference signal includes at least one of:
      a time resource allocated to the first reference signal,
      a frequency resource allocated to the first reference signal, or
      a code division multiplexing resource allocated to the first reference signal.

18. The method of claim 13, wherein a configuration of the second reference signal corresponds to the second device identifier, and
   wherein the configuration of the second reference signal includes at least one of:
      a time resource allocated to the second reference signal,
      a frequency resource allocated to the second reference signal, or
      a code division multiplexing resource allocated to the second reference signal.

19. The method of claim 13, further comprising:
   determining, based at least in part on the first reference signal, at least one of:
      a presence of remote interference,
      an estimated quantity of interfered symbols, or
      an interference power estimation.

20. The method of claim 13, wherein the first reference signal is generated based at least in part on the first device identifier.

21. The method of claim 13, wherein the second reference signal is generated based at least in part on the second device identifier.

22. The method of claim 13, wherein the first base station is configured to transmit a backhaul message to the second base station indicating reception of the first reference signal.

23. The method of claim 13, wherein the first base station is configured to transmit a backhaul message to the second base station indicating a threshold period of time has elapsed since a last reference signal was received.

24. The method of claim 13, wherein the first base station is configured to end transmission of reference signals based at least in part on detecting an end to the remote interference condition.

25. A first base station for wireless communication, comprising:
   memory; and
   one or more processors coupled to the memory, the memory and the one or more processors configured to:
   transmit a first reference signal associated with an occurence of a remote interference condition, wherein the first reference signal corresponds to a first device identifier identifying the first base station; and
   receive, after transmitting the first reference signal, a second reference signal including information indicating a second device identifier identifying a second base station.

26. The first base station of claim 25, wherein the first base station is configured to perform a remote interference management operation based at least in part on the second reference signal.

27. The first base station of claim 25, wherein the first device identifier is at least a portion of a base station identifier identifying the first base station.

28. A first base station for wireless communication, comprising:
   memory; and
   one or more processors coupled to the memory, the memory and the one or more processors configured to:
   receive a first reference signal associated with an occurence of a remote interference condition, wherein the first reference signal corresponds to a first device identifier identifying a second base station; and
   transmit, after receiving the first reference signal, a second reference signal as a response to receiving the first reference signal, wherein the second reference signal includes information indicating a second device identifier identifying the first base station.

29. The first base station of claim 28, wherein the first base station is configured to perform a remote interference management operation based at least in part on the first reference signal.

30. The first base station of claim 28, wherein the first device identifier is at least a portion of a base station identifier identifying the second base station.

* * * * *